US006816174B2

United States Patent
Tiongson et al.

(10) Patent No.: US 6,816,174 B2
(45) Date of Patent: Nov. 9, 2004

(54) METHOD AND APPARATUS FOR VARIABLE DENSITY SCROLL AREA

(75) Inventors: Phillip R Tiongson, New York, NY (US); Louis Weitzman, Brookline, MA (US); Jessica Wu, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 09/739,450

(22) Filed: Dec. 18, 2000

(65) Prior Publication Data

US 2002/0109728 A1 Aug. 15, 2002

(51) Int. Cl.[7] .............................................. G09G 5/34
(52) U.S. Cl. ...................... 345/787; 345/777; 345/776; 345/716; 345/719; 345/723; 345/786; 345/973; 345/784
(58) Field of Search ................................ 345/777, 776, 345/716, 719, 723, 787, 786, 973, 784, 704, 715, 763, 853, 684, 802, 805, 855, 712, 713

(56) References Cited

U.S. PATENT DOCUMENTS

| | | |
|---|---|---|
| 4,602,251 A | 7/1986 | Sawada et al. |
| 5,208,588 A | 5/1993 | Nishiyama |
| 5,623,588 A | 4/1997 | Gould |
| 5,638,523 A * | 6/1997 | Mullet et al. ................ 345/855 |
| 5,659,333 A | 8/1997 | Okishima |
| 5,717,869 A * | 2/1998 | Moran et al. ................ 345/716 |
| 5,745,716 A * | 4/1998 | Tchao et al. ................. 345/777 |
| 5,825,349 A | 10/1998 | Meier et al. |
| 5,867,156 A | 2/1999 | Beard et al. |
| 5,884,056 A * | 3/1999 | Steele ......................... 345/738 |
| 5,903,267 A | 5/1999 | Fisher |
| 5,917,492 A | 6/1999 | Bereiter et al. |
| 5,963,203 A * | 10/1999 | Goldberg et al. ............ 345/723 |
| 6,028,600 A * | 2/2000 | Rosin et al. ................. 345/718 |
| 6,028,603 A * | 2/2000 | Wang et al. ................. 345/776 |
| 6,166,733 A * | 12/2000 | Yamada ....................... 345/776 |
| 6,240,410 B1 * | 5/2001 | Wical ............................ 707/4 |
| 6,308,161 B1 * | 10/2001 | Boden et al. ................... 705/7 |

* cited by examiner

*Primary Examiner*—Kristine Kincaid
*Assistant Examiner*—Sajeda Muhebbullah
(74) *Attorney, Agent, or Firm*—Floyd Gonzalez; Jon A. Gibbons; Fleit, Kain, Gibbons, Gutman, Bongini & Bianco P.L.

(57) ABSTRACT

A method and system to provide a user additional positional context for the information they are browsing and allows for rapid browsing through large data sets thereby providing a more usable interface. Two embodiments are described in the following sections. In the first, the 2-D scroll area is a continuous area. In this continuous embodiment the user can change the scroll resolution on a continuous scale. The second embodiment uses a set of discrete vertical scrolling bars. These scrolling bars work in concert to fine tune the scrolling access to the data.

18 Claims, 9 Drawing Sheets

METHOD AND APPARATUS FOR VARIABLE DENSITY SCROLL AREA

CROSS-REFERENCE TO RELATED APPLICATIONS

Not Applicable.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The present invention relates to the field of scrollable graphical user interfaces and more particularly to two dimensional scroll controls used in graphical user interfaces for scrolling data sets.

2. Description of the Related Art

In many applications, data sets grow to be very large and difficult to access using standard techniques. Searching is only applicable when the user has some notion of what they are looking for. Techniques are needed to enable users easily browse large data sets. When interacting with large sets of data they often lose their context of the source of the information. They "get lost" in the data. Especially when the data is in a visual format, there is a desire by users to easily "scroll" through that data.

One solution to this problem is disclosed in U.S. Pat. No. 5,903,267 entitled "Document Interface Mechanism And Method For Navigating Through Large Documents" with inventor Mark E. Fisher, issued May 11, 1999 and commonly assigned herewith to International Business Machines. Disclosed is a method and apparatus for controlling the scroll rate of a scroll bar slider in a graphical user interface. The preferred embodiment uses a domain mechanism that divides large documents into multiple domains. The document is displayed in a viewing window with the slider moving the document from one of the current domain to the other end. Because the slider only moves within one domain, and not the whole document, the slider sensitivity is reduced such that it can be effectively used to scroll through documents. The document can be moved within the viewing window to other domains by activating one of a plurality of domain marks, where each domain mark represents a domain not currently scrollable with the slider. Thus, the entire document can be easily browsed while the scroll rate is maintained at an effective level. This provides a user with a high degree of control when viewing all sizes of documents. This patent discloses innovative techniques to browse a single document as opposed to browse a large set of documents is part of a data set or part of a database.

Another solution is disclosed in U.S. Pat. No. 5,623,588 entitled "Computer User Interface With Non-salience Deemphasis" with inventor Eric J. Gould, issued Apr. 22, 1997 and assigned to New York University. Disclosed is a relativity controller is a scroll bar/window combination that provides a way to see data in relation to both the context of its wholeness and the salience of its contents. To accomplish this, the linear density or other appearance of the scroll bar (acting as a ruler or scale) varies with the density of the document salience (as indicated by different kinds of annotations or marks). It also provides a way to zoom between perspectives. This is usable on many different data types: including sound, video, graphics, calendars and word processors. In this patent the density of the scroll bar depends on the salience of the area of the data being browsed and not linked to a location within a data set or within a database being browsed.

Still another solution is disclosed in U.S. Pat. No. 5,659,333 entitled "System and Method for Scrolling Control" with inventor Haruhiro Okishima, issued Aug. 19, 1997, and assigned to Fujitsu Limited. Disclosed is a scrolling control is carried out in response to a press of a cursor key or a scroll key. While a scroll control is carried out, data displayed on a screen is reduced, to thereby increase an amount of the data displayed at the same time. This patent does not address the problems of scrolling through a set of data, such a database of image files.

Still another solution is disclosed in U.S. Pat. No. 5,825,349 entitled "Intelligent Scrolling" with inventors John R. Meier et al., issued on Oct. 20, 1998 and assigned to Apple Computer, Inc. Disclosed is a method and apparatus for intelligent scrolling. In a computer system that has a user interface which allows for the movement of items from a first open window to a second open window or to a second region, such as a desktop, the present invention allows a user to select one or more items in the first window, move the selected item(s) to within a predetermined distance from an edge of the first window for a predetermined period of time and cause the viewable portion of the data and/or document within the first window to scroll in a corresponding direction. This allows multiple window scrolling but does not address the problems of scrolling through a data set.

Accordingly, a need exists for a method and apparatus to permit users to scroll through large sets of data, such as a database of image files, while maintaining the positional context of "where" or "what position" in the data set is currently being viewed in relation to the overall data set.

SUMMARY OF THE INVENTION

Briefly, in accordance with the present invention, a method to scroll through a complete multimedia data set. The multimedia data set can include still images, video, audio, and text. The method provides positional context to a user of what position in the overall data set is currently being viewed. The method begins with the application receiving the size of a complete data set. A first scrollable region of indicators is displayed that represents the complete data set. The first scrollable region has a first marker to indicate a current selection from the complete data set. A second scrollable region of indicators is displayed that represents a subset of the complete data set in the first scrollable region, the second scrollable region containing a second marker indicating the current selection from the complete data set. A third region is displayed that has a current selection from the complete multimedia data set. User input is received to move the second marker between a first indicator and a second indication in the second scrollable region of indicators whereby the current selection in the third region is changed to correspond to a new selection from the complete multimedia data set corresponding to the second indicator.

In one embodiment, continuous scrolling through the complete data set is provided by displaying a second scrollable region. The second scrollable region is any geometric shape and in this embodiment a trapezoid is used. The top of the trapezoidal scroll area is oriented to be parallel to the first area and in close proximity thereto, and the base of the trapezoidal scroll area is positioned near the second third area. The trapezoidal area has a series of separators defining a plurality of continuous regions within the trapezoidal scroll area wherein the regions are formed closer together at the top of the trapezoidal scroll area and the regions far-out to be further apart at the bottom of the trapezoidal scroll area.

In another embodiment, discrete scrolling through the complete data set is provided by displaying a second scrollable region comprising one or more adjacent columns of indicators positioned parallel to the first scrollable region. The indicators positioned in the one or more adjacent columns [1, 2, . . . N] are presented in each of the columns starting from a column closest to the first scrollable area, column [1] contains indicators which are a subset of the indicators that represent the complete data set. Column [2] contains indicators that are a subset of the indicators in column [1] and column [N] contains indicators that are a subset of the indicators in column [N−1].

BRIEF DESCRIPTION OF THE DRAWING(S)

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DESCRIPTION OF A PREFERRED EMBODIMENT(S)

Figures 1, 2:
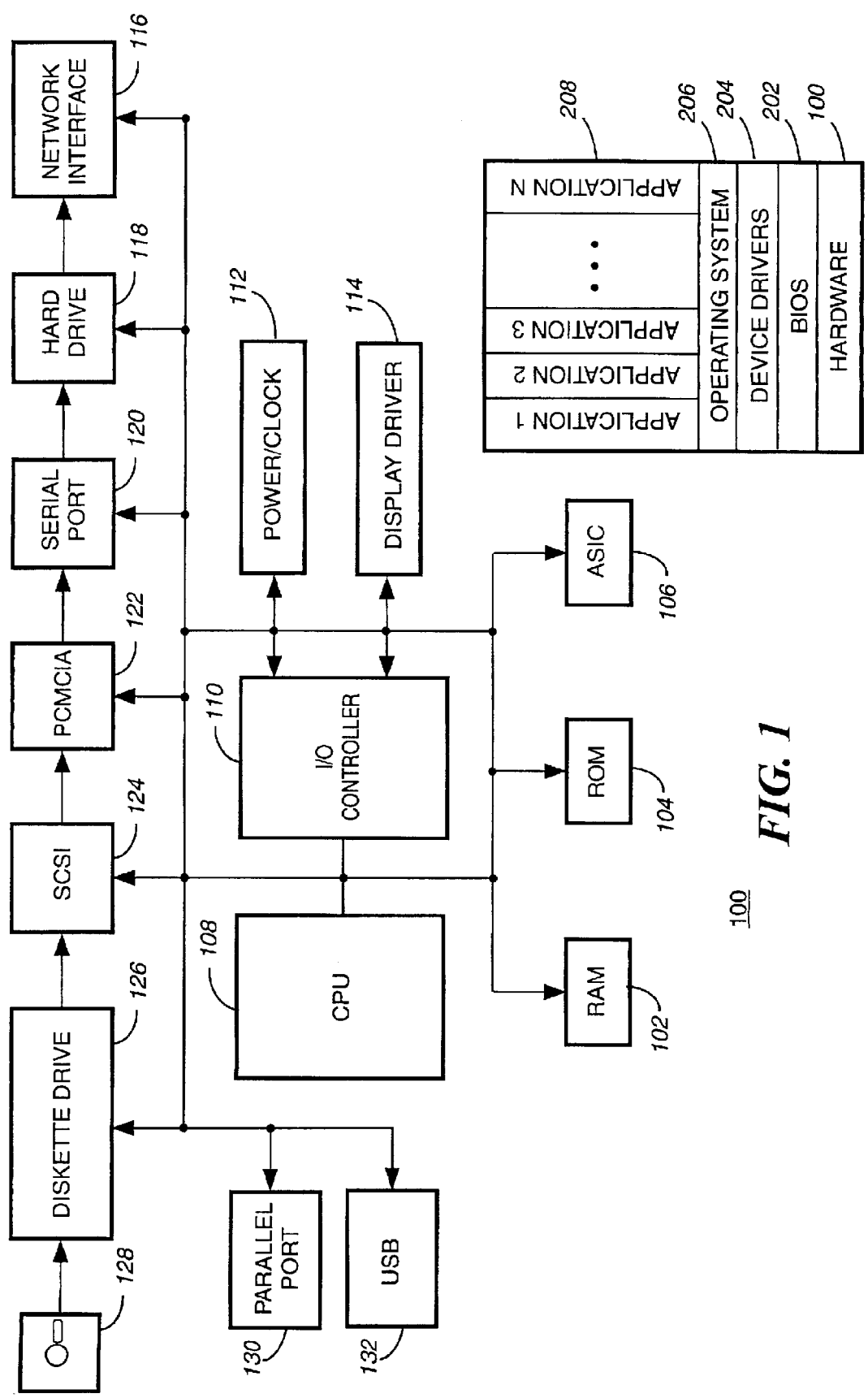
FIG. 1 is a block diagram of the principal components of a PC in which the present invention presently deployed.
FIG. 2 is a block diagram of the software hierarchy in which the present invention is deployed.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing like numerals refer to like parts through several views.

Exemplary Embodiment of A Personal Computer (PC)

Referring to FIG. 1, there is shown a block diagram of the major electrical components of an information processing system 100 in accordance with this invention.

The electrical components include: a central processing unit (CPU) 108, an Input/Output (I/O) Controller 110, a system power and clock source 112; display driver 114; RAM 102; ROM 104; ASIC (application specific integrated circuit) 106 and a hard disk drive 118.

These are representative components of a computer. The operation of a computer comprising these elements is well understood. Network interface 116 provides connection to a computer network such as Ethernet, Token Ring using TCP/IP or other popular network protocol interfaces. Optional components for interfacing to external peripherals include: a Small Computer Systems Interface (SCSI) port 124 for attaching peripherals; a PCMCIA slot 122; serial port 120, parallel port 130 and USB (Universal Serial Bus) 132. An optional diskette drive 126 is shown for loading or saving code to removable diskettes 128 or equivalent computer readable media. In one embodiment, the display driver 114 sends video output to a display (not shown) and receives user selection with a mouse (or other pointing device) and keyboard through I/O Controller 110.

The system 100 may be implemented by combination of hardware and software. Moreover, the functionality required for using the invention may be embodied in computer-readable media (such as 3.5 inch diskette 128) to be used in programming an information-processing apparatus (e.g., a personal computer) to perform in accordance with the invention.

Exemplary Software Hierarchy

FIG. 2 is a block diagram illustrating the software hierarchy for the information processing system of FIG. 1, according to the present invention. The hardware 100 is the information processing system of FIG. 1. BIOS (Basic Input Output System) 202 is a set of low level of computer hardware instructions, usually stored in ROM 104, for communications between an operating system 206, device driver(s) 204 and hardware 100. Device drivers 204 are hardware specific code used to communicate between and operating system 206 and hardware peripherals such as a mouse, CD ROM drive or printer. Applications 208 are software application written in C/C++, Java, assembler or equivalent. Operating system 206 is the master program that loads after BIOS 202 initializes, that controls and runs the hardware 200. Examples of operating systems include DOS™, Windows™ 3.1/95/98/NT/2000/Me, Linux™, Unix™, Macintosh™, AIX™, OS/2™ and equivalent.

Discussion of Hardware and Software Implementation Options

Although the present invention is implemented in Java and can be used as an applet that runs in any Java enabled browser, or as a standalone application where the data is passed into the application from the file system or a database. The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Overview of the Invention for Continuous and Discrete Scrolling

The screen is divided into three distinct areas. A first scrolling area, a second scrolling area, and a viewing area. The second scrolling area is 2-D (two dimensional). A complete data set is represented as a scroll bar in the first scrolling area on the screen. In the following examples the left edge of the screen is shown but it should be understood that any position on the screen can be used. By providing this context of the complete data set, the user is always able to understand from where in the data set the current data is being presented. The system highlights data subsets selected as the user focuses in on the data they are interested in. Selecting with a mouse or other pointing device on a specific item makes the indicator "active" and displays the indicator in the presentation area on the right. The second scrollable area provides more control of access to the information. Moving the mouse pointer horizontally across the display changes the resolution, at which scrolling occurs when moving vertically. In this embodiment, moving left scrolls at a lower resolution (moving through more of the data in a given vertical distance) while moving right scrolls at a higher resolution (moving through less data in a given vertical distance). Stated differently, the second scroll area magnifies a small subset of indicators from the first scroll area (representing the complete data set) that can be scrolled. It should be understood that variable density scrolling is provided by this procedure thereby allowing a user to control the rate at which the scroll occurs.

The viewing area uses the principle of rapid serial visual presentation (RSVP) for displaying the chosen data in a fixed location within the user interface. By using this technique, the user can focus on a single location to see the rapidly presented data as they scroll through the large set of possibilities.

In another embodiment, the objects in the 2-D scroll area are presented as well as the scroll bars themselves. An important aspect of our implementation is to use a physical-based model for the motion of the animated scroll bar and images. The smooth movement illustrates the continuous relationship of objects in the scrollbar to each other. This permits the user to understand the new state of the interface, by seeing how the context changes from state to state.

By using the present invention, the user is provided additional positional context for the information they are browsing and allows for rapid browsing through large data sets thereby providing a more usable interface. Two embodiments are described in the following sections. In the first, the 2-D scroll area is a continuous area. In this continuous embodiment the user can change the scroll resolution on a continuous scale. The second embodiment uses a set of discrete vertical scrolling bars. These scrolling bars work in concert to fine tune the scrolling access to the data.

Exemplary Continuous Scrolling Embodiment

A technique is described now for continuous variable density scroll area (VDSA) to assist in the browsing of a multimedia data set of still images, video, audio and text. This technique actively supports the user in the browsing task by quickly scrolling through large amounts of data. Moreover, the present technique permits the user to easily change the resolution of the scrolling action.

Figure 3:
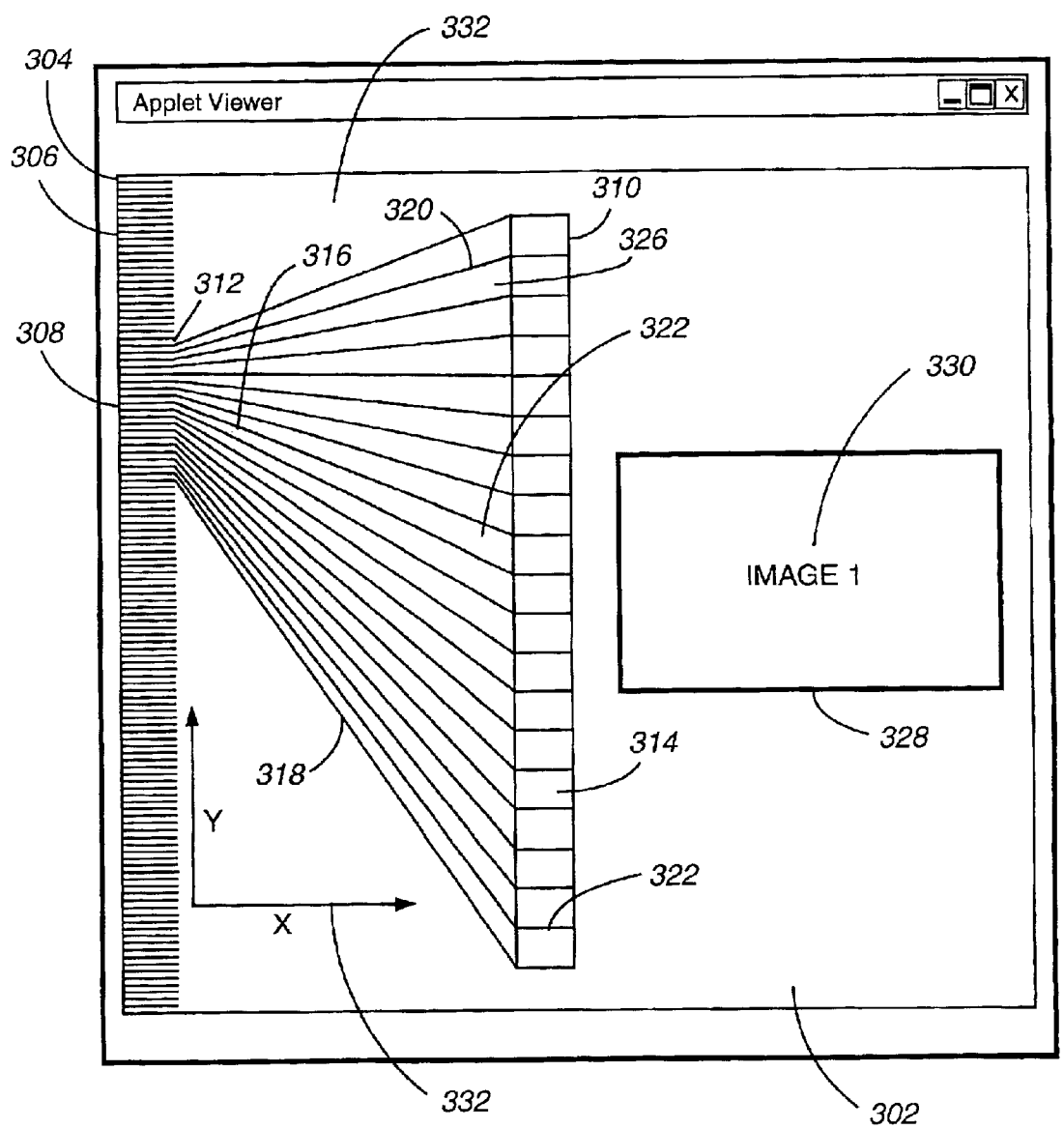
FIG. 3 is a display screen on a display device coupled to the display driver of the information processing system of FIG. 1 illustrating the scroll areas for a continuous scrolling embodiment of the present invention.

Turning now to FIG. 3 is a display screen 300 on a display device (not shown) coupled to the display driver 114 of the information processing system 100 of FIG. 1. An application window 302 running as a standalone application 208, an operating system service 206 or in another embodiment a plugin to a web browser such as Microsoft Internet Explorer or Netscape Navigator is shown. In this embodiment three distinct regions of the screen are illustrated which are now described. The first region 304 provides a series of indicators 306 where the number of the indicators 306 are set to correspond to the number of elements in the complete data set to be viewed. The number elements displayed is also dependent on the resolution available on that portion of the display where the first region 304 is located. The indicators 306 are lines in this example but other characters, letters, numbers, symbols and icons could be used within the true scope and spirit of the present invention. The number of elements in the complete data set is also known as the "size" of the complete data set. A complete data set may be a database of images, pages of text and other multimedia data. A second scrollable region 310 is any geometric shape. Although the second scrollable area is shown as a trapezoidal shape 310, it should be understood that other geometric shapes that illustrate the expansion of data such as triangles and rhombuses could be used within the true scope and spirit of the present invention with a plurality of continuous regions that fan out or "explode" from the first region 304. A trapezoidal scroll area 310 having top 312, sides 318, and bottom area 314 is shown. The top 312 of the trapezoidal scroll area 310 is shown next to the first scroll area 304. The trapezoidal scroll area 310 is divided into a series of continuous areas 326 that fan out from the top 312 toward the bottom 314. In this embodiment, lines 320 are used to form rectangular areas 326. A marker 316 is shown to illustrate the current position inside the trapezoidal area 310. The continuous area 322 that is occupied by the marker 316 is highlighted as shown. The highlighting or shading in the current area 322 is optional and is not necessary to realize the benefits of the scrolling technique presented in this invention. It is important to point out in this embodiment that each of the series of continuous areas 326 corresponds directly to items the complete data set. The series of continuous areas 326 is a subset of the total number of indicators 306 in the first scroll area 304. In this embodiment the number of continuous areas 326 shown is 19 but any subset can be set by the user to aid in navigation of the complete data set. The marker 316 in the highlighted continuous area 322 corresponds to the indicator 308 to provide positional context of "where" the user is positioned in the complete data set. The third region 328 in the application window 302 displays the current selection from the complete data set. In this example an image 330 is shown in the third region 328. Accordingly, the selected data in this example, image 330, is shown by marker 308 as where, i.e., the position the complete data set the user is browsing. The second area 310 is a subset of the first region. Now if a user selects either the first region 304 or the second region 310 with a graphical pointer such as a mouse, trackball, TrackPoint™, or other graphical pointing device the current marker 308 in the complete set of indicators 306 in the first region updates to correspond to the new position. Likewise the current continuous area 322 in the second region 310 updates and the image 328 in the third area 326 also updates to correspond to the user selection from the complete data set. It should be understood that if a user wants to have finer control of the scrolling through the data set the user selects an area on the scrollable trapezoidal area 310 that is closer to the base 314. On the other hand for less granular control, the user selects any of the indicators 306 in the first scrollable area or any area closer to the top 312 of the trapezoidal scrollable area. By selecting different areas around the trapezoidal scrollable area 310, the user rapidly changes the "granularity" of the scrolling. Stated differently, for a large data set, each indicator in scrollable area may occupy only one pixel. In this example, the second scrollable area 310 expands the capability to select an indicator from only one pixel per entry in the data set to all the pixels that occupy one of the continuous area 326 (in this embodiment a single row) in the second scrollable area 310. Taken even further, in another example one pixel in 306 may reflect many elements in the original data set. Lastly, a position outside the trapezoidal area 332 is shown 332 which may be used to rapidly drag the whole trapezoidal area to a new position relative to the first scrollable region 304.

Figure 4:
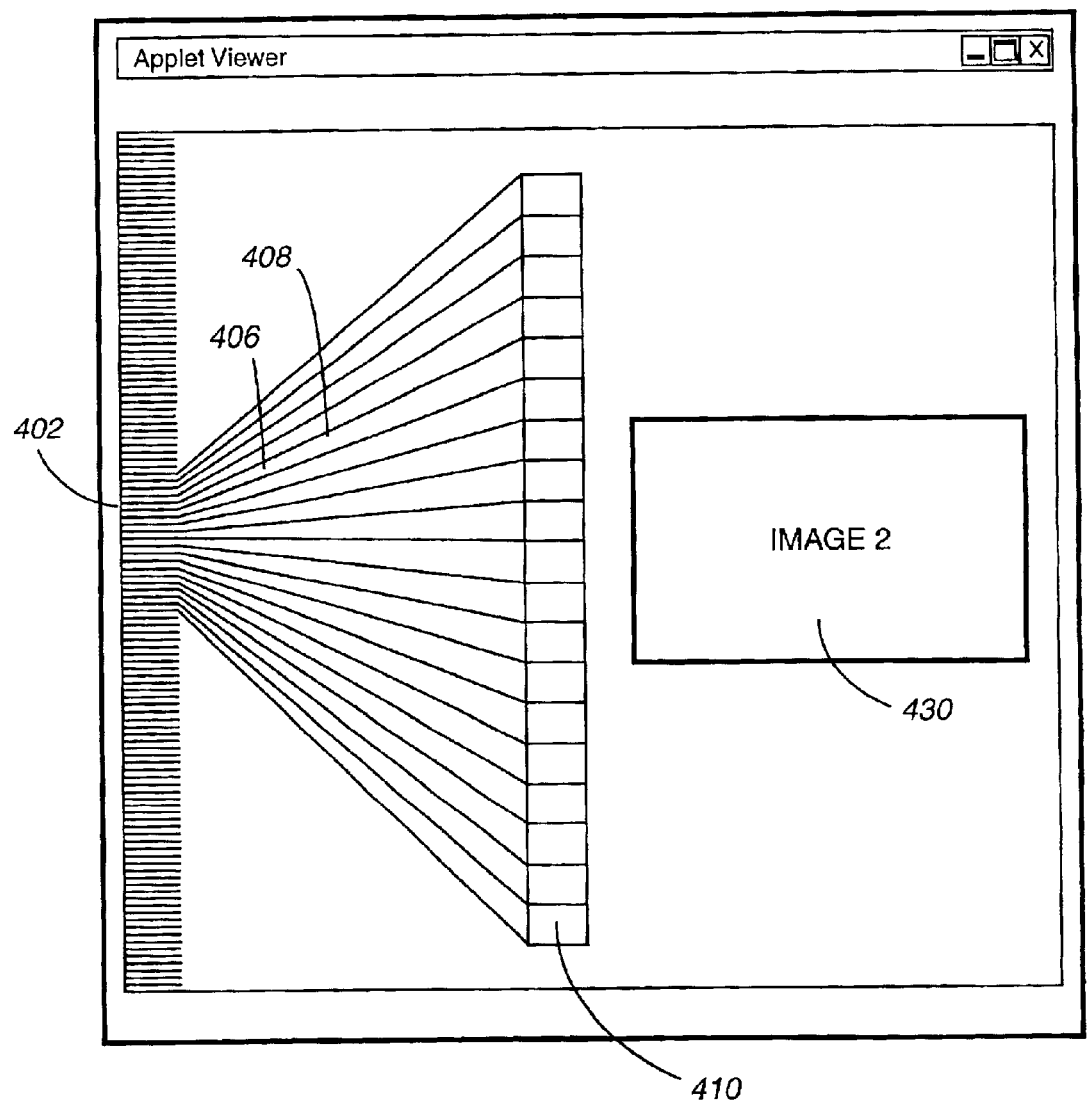
FIG. 4 is a display screen on a display device for the embodiment of FIG. 3 when the user selected a new position in the data set, according to the present invention.

The process of moving and updating the three regions on the application window 302 are shown in FIG. 4. When the user selects a new indicator 402 in the first area 304 the position and shape of the scrollable trapezoidal area 410 may change as shown. Here the user has selected an indicator 402 which is near the middle of the first scrollable area 304. The second scrollable area 310 in this example becomes an isosceles trapezoidal scrollable area 410 and the corresponding continuous area 326 or row in this embodiment 408 with marker 406 is shown. Likewise, a new image 430 is shown in the third region 326. The user is able to understand quickly their current overall position in the complete data set by the indicator 402 in first scroll area 306. In addition, the user can selectively scroll through the second area by moving the mouse in a large vertical direction with finer granularity near the bottom 314 of the trapezoidal area. Alternately the user can have less granularity near the top 312.

The geometry related to the second scroll area 310 is further described with reference to FIG. 5. A screen shot 500 illustrates the effective scrolling rate based on the distance inside the trapezoidal area, according to the present invention. A base line 502 indicates where the current marker 308 in the first scroll area 306 is located. If the user wants more granular scrolling, the user selects a point in the second scrollable 410 area further out, i.e., a greater X distance 506 from the first scrolling area. This second trapezoidal area 410 has more pixels per row 526 near the bottom 314 than near the top 312. Therefore, the Y distance that must be scrolled or moved with a pointing device is greater where the X distance is greater. Conversely, if we take an example where one indicator on the first area is equal to one element in the data set, the user only has to move a vertical distance of one pixel to move to the next element in the data set. Whereas the user must move the distance of one row (several pixels) near the bottom 314 of the trapezoidal scrollable area 410.

Stated differently, if each row in the scrollable trapezoidal area 410 is a right triangle with the base of the triangle corresponding to the base of the trapezoidal scroll area 410 for a given continuous scroll area 326, the distance in pixels the user has to travel will depend on X position:

$$\text{distance in } Y \text{ to travel} = X \text{ distance} * \text{TAN } \theta$$

where $\theta$ is the angle formed between the base line and a line defining a continuous scroll area.

In another embodiment for the continuous scrolling embodiment, the continuous scroll area 326 are not uniform so that Y distance for each continuous scroll area varies. In this embodiment each scroll area 426 in the uniform scroll area may be different as shown in FIG. 5B.

Figure 5A:
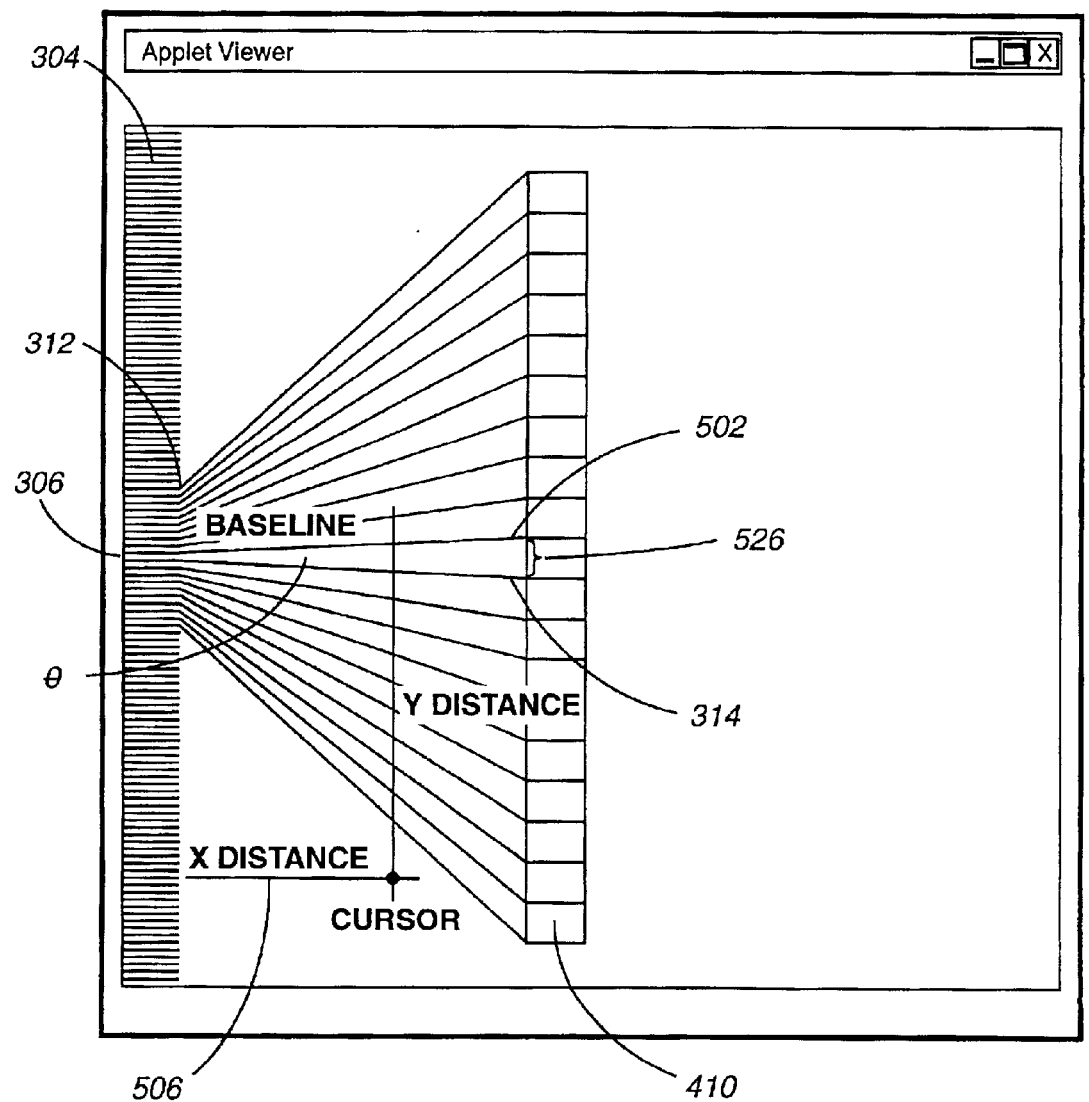
FIG. 5A is a screen shot of FIG. 4 illustrating the geometry to change distance based on the distance inside the trapezoidal area, according to the present invention.
Figure 5B:
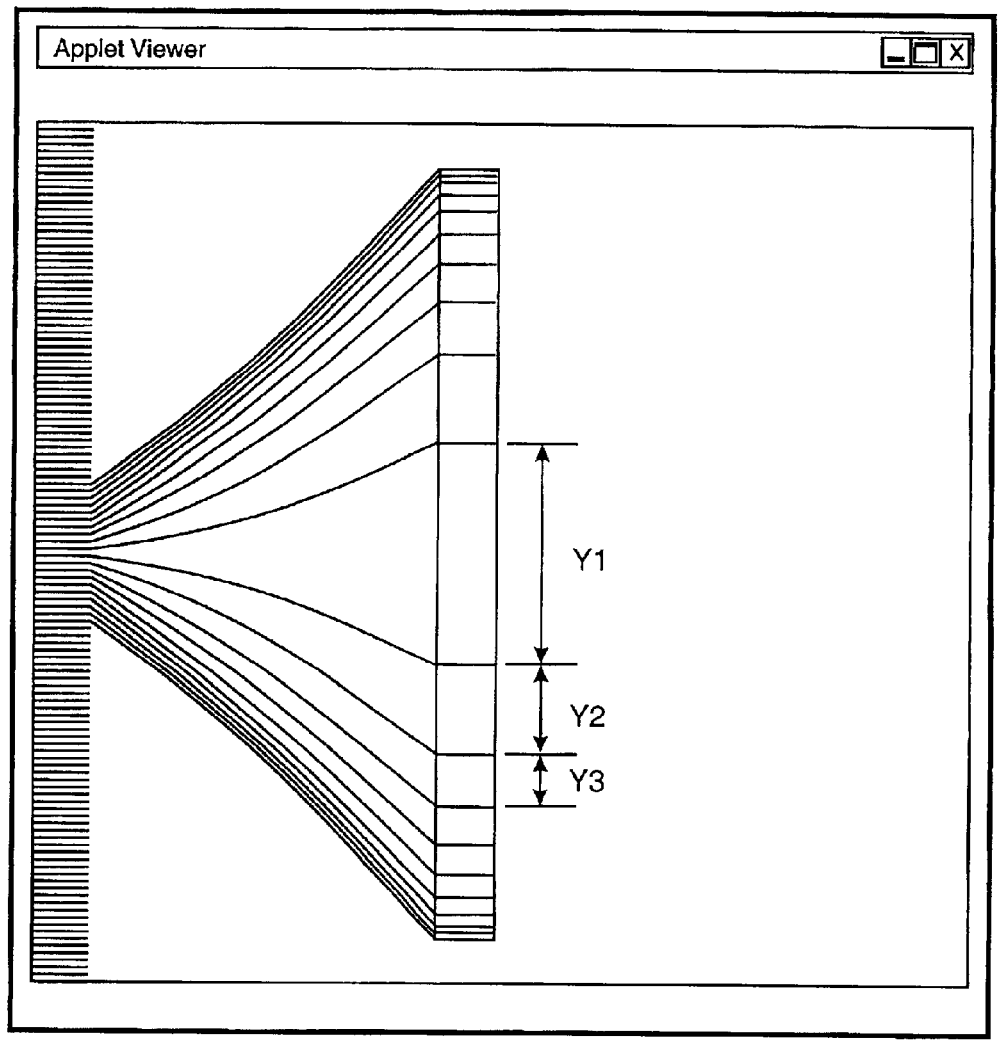
FIG. 5B is an alternate embodiment of FIG. 5A where the distance of the scroll areas inside the trapezoidal area is not uniform, according to the present invention.

In still another embodiment, the trapezoidal scrollable area shown in FIGS. 3–5 has an edge 324 to provide a three-dimensional appearance to the scrollable area and this is optional. The edge 324 may contain thumbnail images corresponding to the subset of data being expanded in the second scrollable area 310 from the complete data set. The thumbnail images provide to the user quick references of the data in the data set that falls "before" and "after" the current data set.

In yet, still another embodiment, when the user selects another image to display in either the first scroll area or the second scroll area, scroll animation of movement takes place. The animation provides a series of intermediary transition steps from the previous current position to the new current position in the complete data set selected by the user. During the transition steps, instead of just having the marker 408, the marker 316, and the image 330 jump from the previous to the new current position, a series of intermediate steps are shown. For example the movement from FIG. 3 to FIG. 4 in this animation embodiment, displays a series of ten intermediary positions of the marker 308, the current continuous area 322 moving through the series of continuous areas 326. The number of intermediary positions illustrated can change depending on the distance through the data set traveled during the scrolling operation and the desired duration of the animation sequence. For instance a large distance traveled through the data set would have a higher number of intermediary positions while a smaller distance traveled through the data set would have a lower number. The use of animation further assists making the user understand how the complete data set is being scrolled.

In an embodiment, especially suitable for cases where the complete data set is large, if the user selects area 332 outside the trapezoidal area 332, the scrolling rate during the dragging of the trapezoidal area is controlled by the X distance from the first region chosen. Accordingly, it should be understood that even in the area outside the trapezoidal area 332, the rate of scrolling (i.e., the change in movement along the Y direction) is controlled by the distance away from the first region an area 304 along the X direction.

Exemplary Discrete Scrolling Embodiment

Figure 6:
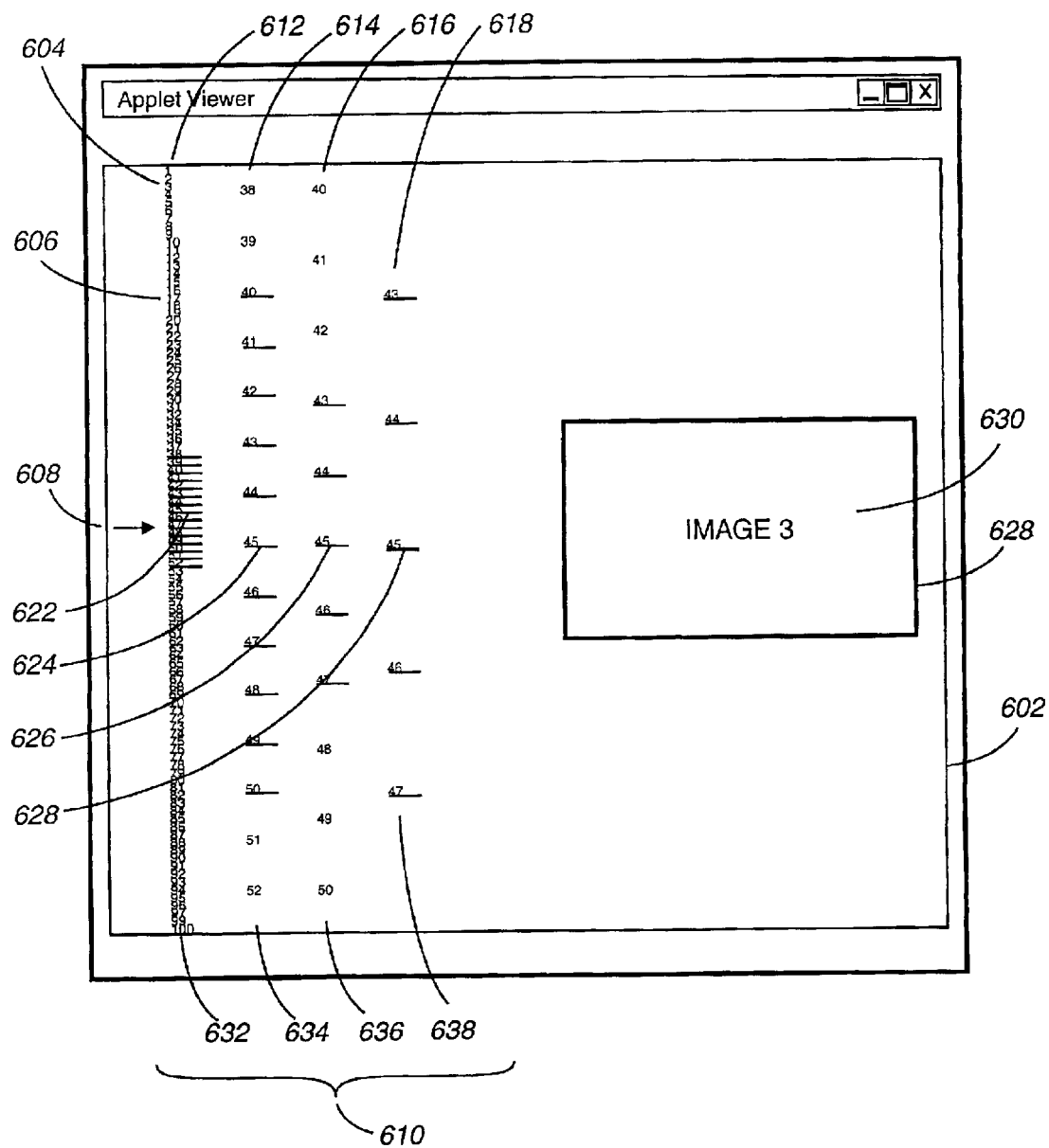
FIG. 6 is a screen shot of another embodiment of FIG. 4 for discrete scrolling, according to the present invention.

Turning now to FIG. 6 is a screen shot 600 of another embodiment of FIG. 4, according to the present invention. An application window 602 running as a standalone application 208, an operating system service 206 or in another embodiment a plugin to a web browser such as Microsoft Internet Explorer or Netscape Navigator is shown. In this embodiment three distinct regions of the screen are illustrated which are now described. The first region 604 provides a series of indicators 606 where the number of the indicators 606 are set to correspond to the number of elements in the complete data set to be viewed. The indicators 606 are lines in this example but other characters, letters, numbers, symbols and icons could be used within the true scope and spirit of the present invention. As described above for FIG. 3 in the continuous embodiment, the number of indicators 606 here are set to the number of elements in the complete data set. Instead of the trapezoidal scrollable area 310 of the continuous embodiment, the second scrollable area 610 comprises a plurality of parallel columns 612–618 as shown. In this example the number of parallel columns is set to 4 but as understood to those of average skill in the art, any number may be used from 1 to N. A marker 622, 624, 626, and 628 in each of the four columns 612, 614, 616, and 618 in scrollable area 606 of numeric indicators 604 is shown to designate the current selection. Each of the parallel columns 612–618 contains a series of indicators 632–638. The indicators 632–638 are numbers in this example but other characters, letters, numbers, symbols and icons could be used within the true scope and spirit of the present invention. In this example if the number of elements in the complete data set is for example 100, the numerical indicators run from 1 to 100 and depending on the screen resolution only certain internals may be displayed such as every 5 numbers. Now starting from the left most column 612 and working to the right most column 618 shown column 612 has numeric indicators 1 through 100 shown. Notice that the marker in this column designates numeric indicators 38–52. In column 614 the indicators 634 are a subset of the indicators 632 in column 612. The numeric indicators 634 in column 614 run from 38 through 52. The numeric indicators 634 are a subset of the previous column 632. The numeric indicator 632 are spaced out in a greater line spacing than the numeric indicators in column 632. This increased line spacing (i.e., vertical distance between numeric indicators) is because the subset has the same vertical distance for fewer numeric indicators. The markers 624 designate numeric indicators 40 to 50. Continuing onto column 616, the numeric indicators 636 run from 40 to 50, which are a subset of the numeric indicators from the previous column 634. The markers 626 run from 43 to 47. And finally the last column 618 in this example has numeric indicators 638 running from 43 to 47. The marker is on numeric 45 indicating that this is the current entry in the data set being displayed. A third region 628 in the application window 602 displays the current selection from the complete data set. In this example an image 630 is shown in the third region 628.

Figure 7:
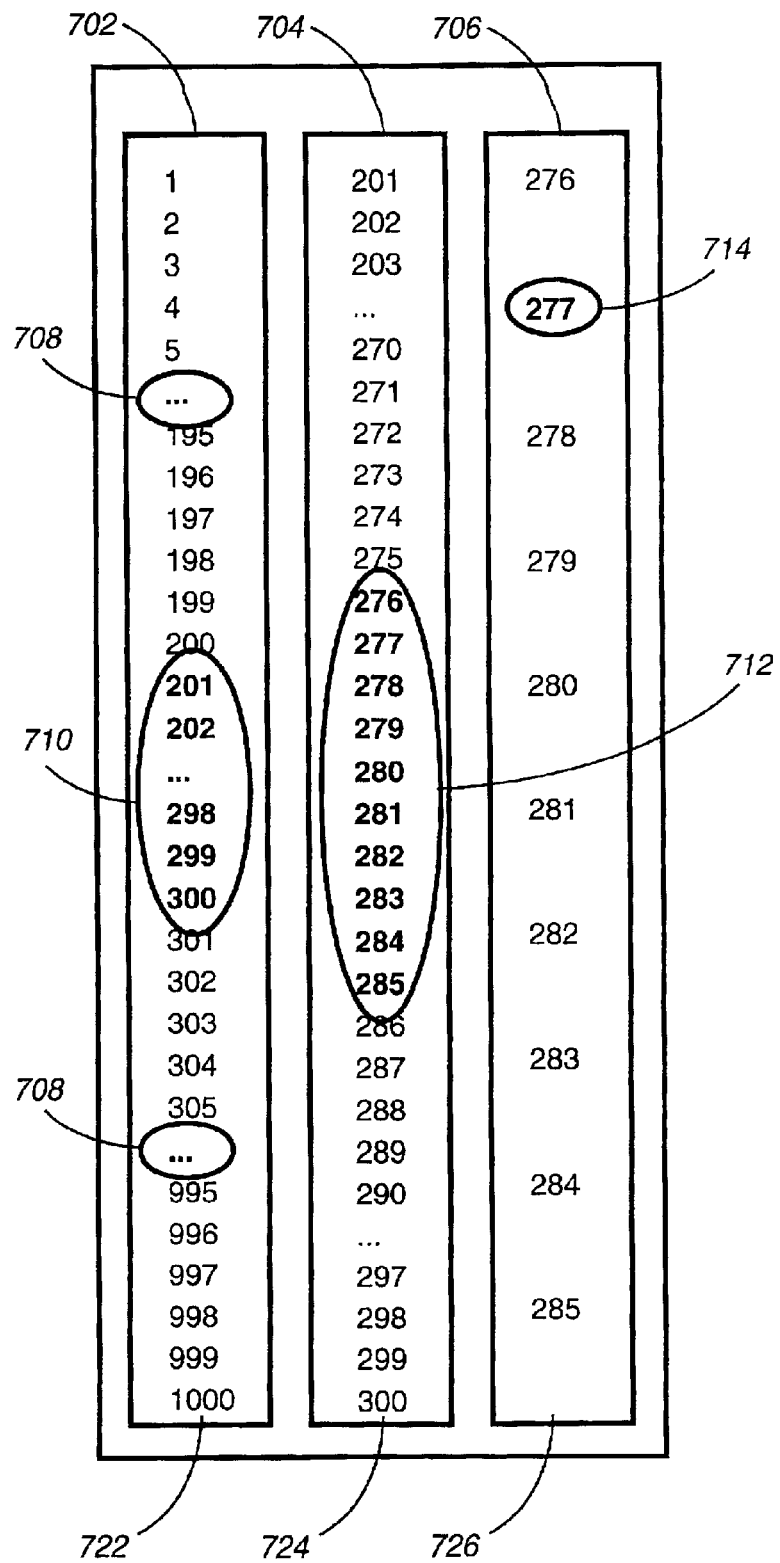
FIG. 7 is a detailed view of the columns of alternate embodiment of FIG. 6, according to the present invention.

FIG. 7 is a detailed view of the second scrollable area 700 comprising the columns of alternate embodiment of FIG. 6, according to the present invention. Shown are three columns 702, 704, and 706. The numeric indicators 722 run from 1 through 1000 in column 702. Notice that the numbers are not continuous and show gaps 708. The numeric indicators near the current selected view are in a different color 710 instead of using markers as was shown in FIG. 6. Column 704 has a subset of the numeric indicators 724 running from 201 through 300. Again the numbers near the current view are highlighted 712. Lastly, the numeric indicators 726 in column 706 run from 276 through 285. Notice that there is only one numeric indicator highlighted 714. This corresponds to the current data selected from the data set. The line spacing in each column increases from column 702 through 706. As was described in the continuous embodiment above for the second scrollable area 310, the user in this embodiment can select a numeric indicators in any of the columns 722, 724, and 726 in the second scrollable area 700. Because the line spacing between the numbers in column 726 is greater than the line spacing in the column 702, the user has a choice on where to scroll using a large vertical distance or a small vertical distance. The tradeoff is how much granularity in the vertical distance the user wants at that moment. A user wanting finer granularity would choose a number in column 706, a user wanting less granularity would choose a number in column 702. It should be understood that by showing the expansion of the data set with numeric indicators, a user can scroll through large sets of data while maintaining their context of the source of the information and thereby avoid losing which portion of the large set of data is currently being viewed.

In still another embodiment, the right most column (620 and 726) in FIGS. 6 and 7 has an edge (not shown and similar to 324 of FIG. 3) to provide a three-dimensional appearance to the scrollable area and this is optional. The edge may contain thumbnail images corresponding to the subset of data being expanded in the second scrollable area 610 from the complete data set. The thumbnail images provide to the user quick references of the data in the data set that "before" and "after" the selected continuous area 322.

In yet, still another embodiment, when the user selects another image to display in either the first scroll area or the second scroll area, scroll animation of movement takes place. The animation provides a series of intermediary transition steps from the previous current position to the new current position in the complete data set selected by the user. During the transition steps, instead of just having the marker 608, the markers 622, 624, 628 and 630, and the image 330 jump from the previous to the new current position, a series of intermediate steps are shown. The number of intermediary positions illustrated can change depending on the distance through the data set traveled. For instance a large distance traveled through the data set would have a higher number of intermediary positions whereas a smaller data set would have a lower number of intermediary steps. The use of animation further assists making the user understand how to complete data set is being scrolled. In another embodiment, the rate of intermediary positions shown may increase proportional to the distanced traveled.

An exemplary code fragment illustrating an algorithm for determining the number of indicators in each scroll column in the second scrollable area 610 is now described. It should be understood that more sophisticated algorithms may use different allocation techniques of elements to the various scroll columns which are within the true scope and spirit of the present invention.

Given N elements in the data set:

```
M = N; minimum = 10;        // minimum = number of elements in
I = 1; factor = 10;         // right column;
                            // factor = used to reduce M elements
                            // in each column to right;
While (M > minimum) {       // test to see if m is < minimum for right
                            // column;
ColumnSize(I) = M           // number of elements for each column
M = M/factor;               // calculate next set of content
I = I + 1;                  // increment count
}
```

Exemplary Flow Diagram for Carrying out the Continuous and Discrete Embodiments

Figure 8A:
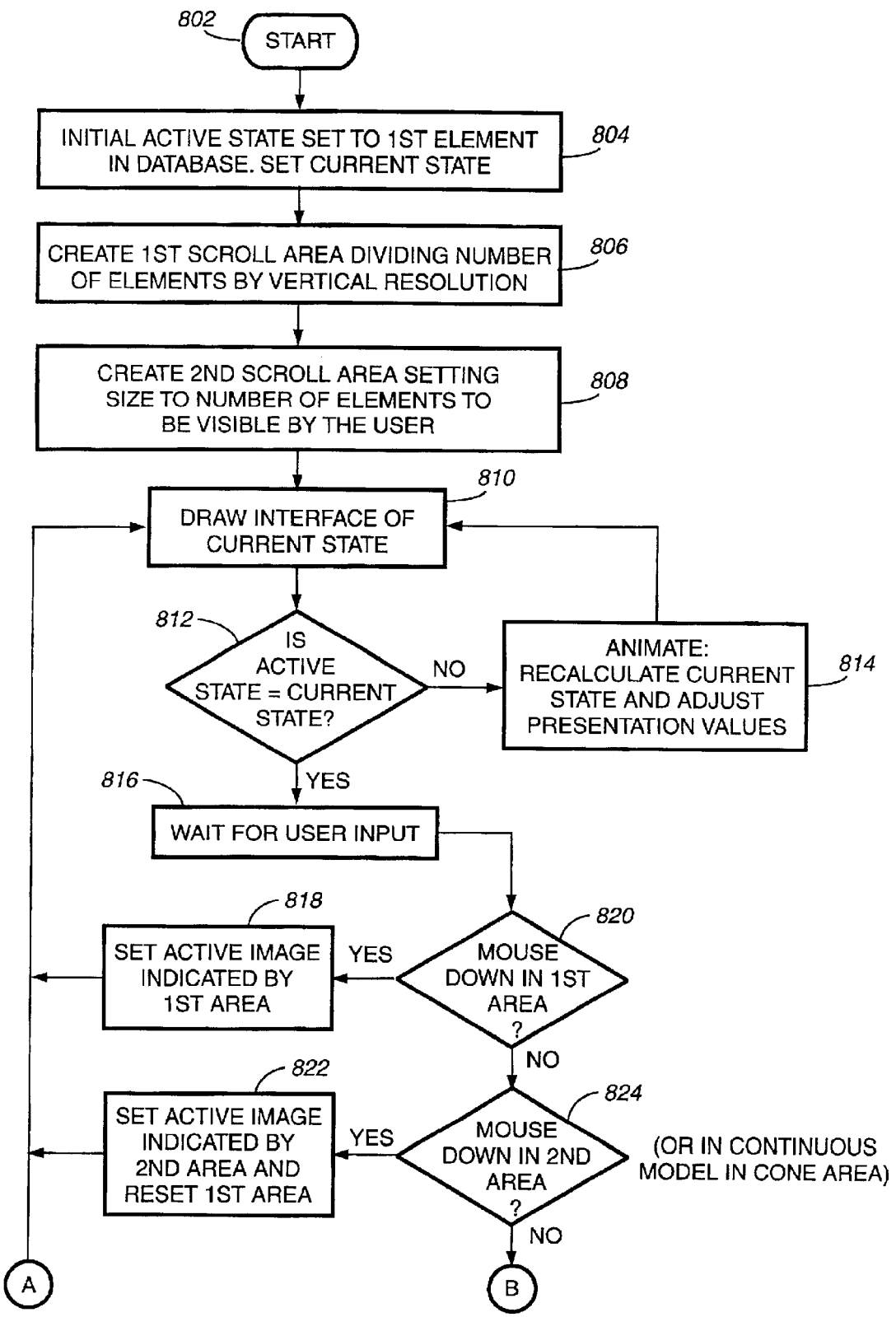
FIG. 8 is flow diagram for carrying out the discrete and continuous scrolling according to the present invention.
Figure 8B:
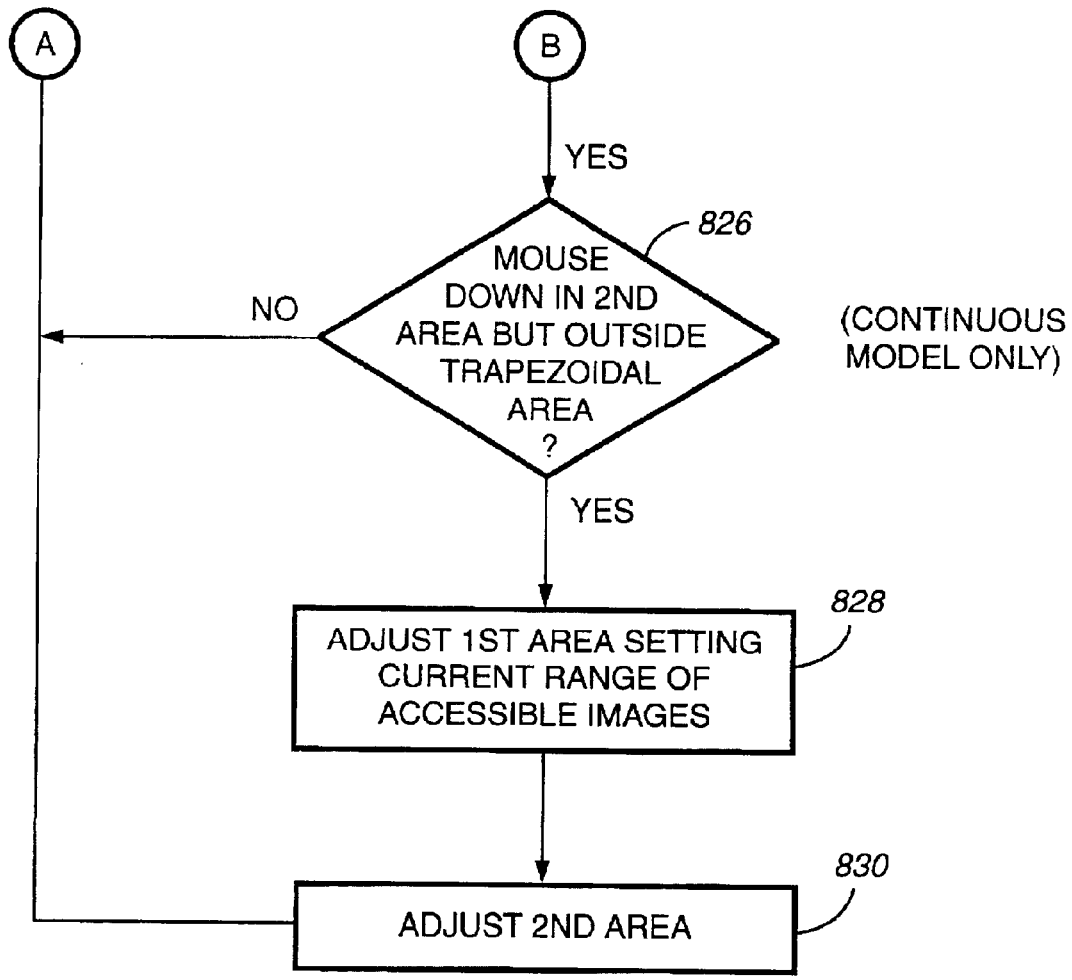

FIG. 8 is flow diagram 800 for carrying out the discrete and continuous scrolling according to the present invention. The process flow begins with pointers to the data set being initialized in steps 802, and 804. The initial active states is set to the first element in the database or data set. Next, the current state is set and this will enable animation when the system comes up. In step 806, the first scroll area dividing number of elements by vertical resolution. And in step 808 the second scroll area (304 or 604) setting size to number of element to be visible to user. The interface of the current state is now drawn in step 810 and this begins a loop. This is different for discrete embodiment 610 versus the continuous embodiment 310. A test is made in step 812 to determine if the current state the active state, or stated differently is the selected current indicator by the user equal to previous current indicator. If it is not the position is recalculated and adjusted to the present values in step 814 and goes to step 810. If it is equal the system waits for the user input, in step 816 by the following steps. Step 820 test to determine if the mouse is in the first scrollable area. If the mouse, in step 820 is in the first scrollable area is set then the process proceeds to step 818. In step 818, the image is set as indicated by the first area and the second area is correspondingly update as well. Next, a test is made to determine if the mouse down in the second scrollable area in step 824. If this test is true then the marker(s) in the second area are set and the markers in the first area reset in step 822. If the test in step 824 is false, a test is made to determine if the mouse is down in the second area but outside the trapezoidal area, e.g. area 332 of FIG. 3 in step 826. This test in step 826 is only made for in the continuous scrolling embodiment. If the test is false in step 826, the process returns to step 810. If the process in step 826 is true, then in step 828 the first scrollable area is adjusted to correspond to the current selected range of accessible images and in step 830 the second scrollable area is adjusted.

While the invention has been illustrated and described in the preferred embodiments, many modifications and changes therein may be affected by those skilled in the art. It is to be understood that the invention is not limited to the precise construction herein disclosed. Accordingly, the right is reserved to all changes and modification coming within the true spirit and scope of the invention.

What we claim is:

1. A method for scrolling through at least part of a complete multimedia data set including still images, video, audio, and text, the method comprising:
   receiving the size of a complete data set;
   displaying a first scrollable region of indicators that represent the complete data set, the first scrollable region having a first marker to indicate a current selection from the complete data set;
   displaying a second scrollable region of indicators that represents a subset of the complete data set in the first scrollable region, the subset containing less data than is contained in the complete data set and the second scrollable region containing a second marker indicating the current selection from the complete data set;
   displaying a third region for displaying a current selection from the complete multimedia data set;
   and receiving user input to move the second marker between a first indicator and a second indicator in the second scrollable region of indicators whereby the current selection in the third region is changed to correspond to a new selection from the complete multimedia data set corresponding to the second indicator;
   wherein the step of displaying a second scrollable region includes displaying a second scrollable region formed to illustrate an expansion of the subset of the complete data set as a geometric shape selected from the group of geometric shapes consisting of trapezoids, rhombuses, triangles and rectangles, wherein the geometric shape comprising a scroll area forming a base, a top, a first side and a second side, the scroll area oriented so that the top is parallel to the first area and in close proximity thereto, and the base is positioned near the second area, and a series of separators defining a plurality of continuous regions within the scroll area wherein the regions are formed closer together at the top of the scroll area and the regions fan-out to be further apart at the bottom of the scroll area.

2. The method according to claim 1, wherein the step of displaying a second scrollable region includes displaying a second scrollable region with an edge adjacent to the third region, and the edge comprises a series of thumbnail images corresponding to images included in the subset of the complete data set.

3. The method according to claim 1, wherein the step of displaying a first scrollable region of indicators includes displaying the first scrollable region of indicators along an edge of a display.

4. The method according to claim 1, wherein the step of displaying a second scrollable region includes displaying the series of separators defining a plurality of continuous regions selected from a group of separators consisting of lines and curves.

5. The method according to claim 1, wherein the steps of displaying a first scrollable region includes displaying the first scrollable region through a web browser interface.

6. The method according to claim 1, wherein the step of displaying a second scrollable region includes displaying a second scrollable region comprising a trapezoidal scroll area which is isosceles when the first marker to indicate the current selection from the complete data set is placed within the first scroll region at a position that indicates a position which is approximately halfway through the complete data set.

7. The method according to claim 1, wherein the step of displaying a second scrollable region includes displaying a second scrollable region comprising two or more adjacent columns of indicators positioned parallel to the first scrollable region, the indicators positioned in the two or more adjacent columns so that a series of indicators are presented in each of the columns starting from a column closest to the first scrollable area contains indicators which are a subset of the indicators that represent the complete data set and each of the subsequent columns immediately adjacent to the first column contains a subset of the indicators in a column which closer to the first column.

8. The method according to claim 7, wherein the step of displaying a second scrollable region includes displaying a second scrollable region comprising two more adjacent columns further comprising the sub-steps of:

animating the display of the indicators in the columns so that the indicators are updated in linear rolling motion through the columns to reflect any new subset of indicators positioned into place whenever the user input to move the second marker is received.

9. A computer readable medium comprising programing instructions for scrolling through at least part of a complete multimedia data set including still images, video, audio, and text, the method comprising:

receiving the size of a complete data set;

displaying a first scrollable region of indicators that represent the complete data set, the first scrollable region having a first marker to indicate a current selection from the complete data set;

displaying a second scrollable region of indicators that represents a subset of the complete data set in the first scrollable region, the second scrollable region containing a second marker indicating the current selection from the complete data set;

displaying a third region for displaying a current selection from the complete multimedia data set; and receiving user input to move the second marker between a first indicator and a second indication in the second scrollable region of indicators whereby the current selection in the third region is changed to correspond to a new selection from the complete multimedia data set corresponding to the second indicator;

wherein the programming instruction of displaying a second scrollable region includes displaying a second scrollable region formed to illustrate an expansion of the subset of the complete data set as a geometric shape selected from the group of geometric shapes consisting of trapezoids, rhombuses, triangles and rectangles, wherein the geometric shape comprising a scroll area forming a base, a top, a first side and a second side, the scroll area oriented so that the top is parallel to the first area and in dose proximity thereto, and the base is positioned near the second area, and a series of separators defining a plurality of continuous regions within the scroll area wherein the regions are formed closer together at the top of the scroll area and the regions fan-out to be further apart at the bottom of the scroll area.

10. The computer readable medium according to claim 9, wherein the programming step of displaying a second scrollable region includes displaying a second scrollable region comprising two or more adjacent columns of indicators positioned parallel to the first scrollable region, the indicators positioned in the two or more adjacent columns so that a series of indicators are presented in each of the columns starting from a column closest to the first scrollable area contains indicators which are a subset of the indicators that represent the complete data set and each of the subsequent columns immediately adjacent to the first column contains a subset of the indicators in a column which closer to the first column.

11. An information processing system with a display for presenting a graphical user interface (GUI) for two dimensional (2-D) scrolling through at least part of a complete multimedia data set including still images, video, audio, and text, the information processing system comprising:

a memory device for receiving parameters for size of a complete multimedia data set;

a display for presenting a GUI with a plurality of areas comprising:

a first scrollable area for displaying a series of indicators that represents the complete multimedia data set; and a second scrollable area for displaying a geometric shape;

a third area for displaying a current selection from the complete multimedia data set;

wherein the geometric shape is trapezoidal scroll area, the trapezoidal scroll area forming a base, a top, a first side and a second side, the trapezoidal scroll area oriented so that the top is parallel to the first scrollable area and in close proximity thereto, and the base is positioned near the third area, and a series of separators defining a plurality of continuous regions within the trapezoidal scroll area wherein the regions are formed closer together at the top of the trapezoidal scroll area and the regions fan-out to be further apart at the bottom of the trapezoidal scroll area;

a marker presented in the trapezoidal scroll area for designating the current selection from the complete multimedia data set so that when a user moves the marker from a first region to a second region within the plurality of continuous regions, the current selection in the first scrollable area is changed to a new selection from the complete multimedia data set.

12. The information processing system according to claim 11, wherein the series of separators defining a plurality of continuous regions is selected from a group of separators consisting of lines and curves.

13. The information processing system according to claim 12, wherein the display has an outer border and the first scrollable area is displayed along the outer border.

14. The information processing system according to claim 12, wherein the first scrollable area further comprises a current selection data marker for displaying a graphic indicator of the current selection being displayed in the third area from the complete multimedia date set.

15. The information processing system according to claim 14, wherein the first scrollable area further comprises means for repositioning the top of the trapezoidal scroll area along the first scrollable area when a user selects a region in the first scrollable area.

16. The information processing system according to claim 15, wherein the trapezoidal scroll area further comprising a region in the plurality of continuous regions that contains the marker is shaded to indicate that current selection in the scrolling trapezoidal area.

17. The information processing system according to claim 16, wherein the means for repositioning the top of the trapezoidal scroll area includes repositioning the marker in a region in the plurality of continuous region that is formed near the center of the base of the trapezoidal scroll area.

18. An information processing system with a display for presenting a graphical user interface (GUI) for two dimensional (2-D) scrolling through at least part of a complete multimedia data set including still images, video, audio, and text, the information processing system comprising:

a memory device for receiving parameters for a size of a complete multimedia data set;

a display for presenting a GUI with a plurality of areas comprising:

a first scrollable area for displaying a series of indicators that represents the complete multimedia data set;

a second scrollable area for displaying two or more adjacent columns of indicators positioned parallel to the first scrollable area, the indicators positioned in the two or more adjacent columns so that a series of indicators are presented in each of the columns starting from a column closest to the first scrollable area contains indicators which are a subset of the indicators that represent the complete data set and each of the columns subsequently immediately adjacent to the first column contains a subset of the indicators in a column which closer to the first column; and a third area for displaying a current selection from the complete multimedia data set;

a marker presented in a column furthest from the third area for designating the current selection from the subset of indicators so that when a user moves the marker from a first indicator to a second indicator within the subset of indicators, the current selection in the first area is changed to a new selection from the complete multimedia data set.

* * * * *